May 23, 1961     C. J. RENKEN, JR     2,985,824
NONDESTRUCTIVE EDDY CURRENT TESTING
Filed April 14, 1958     2 Sheets—Sheet 1
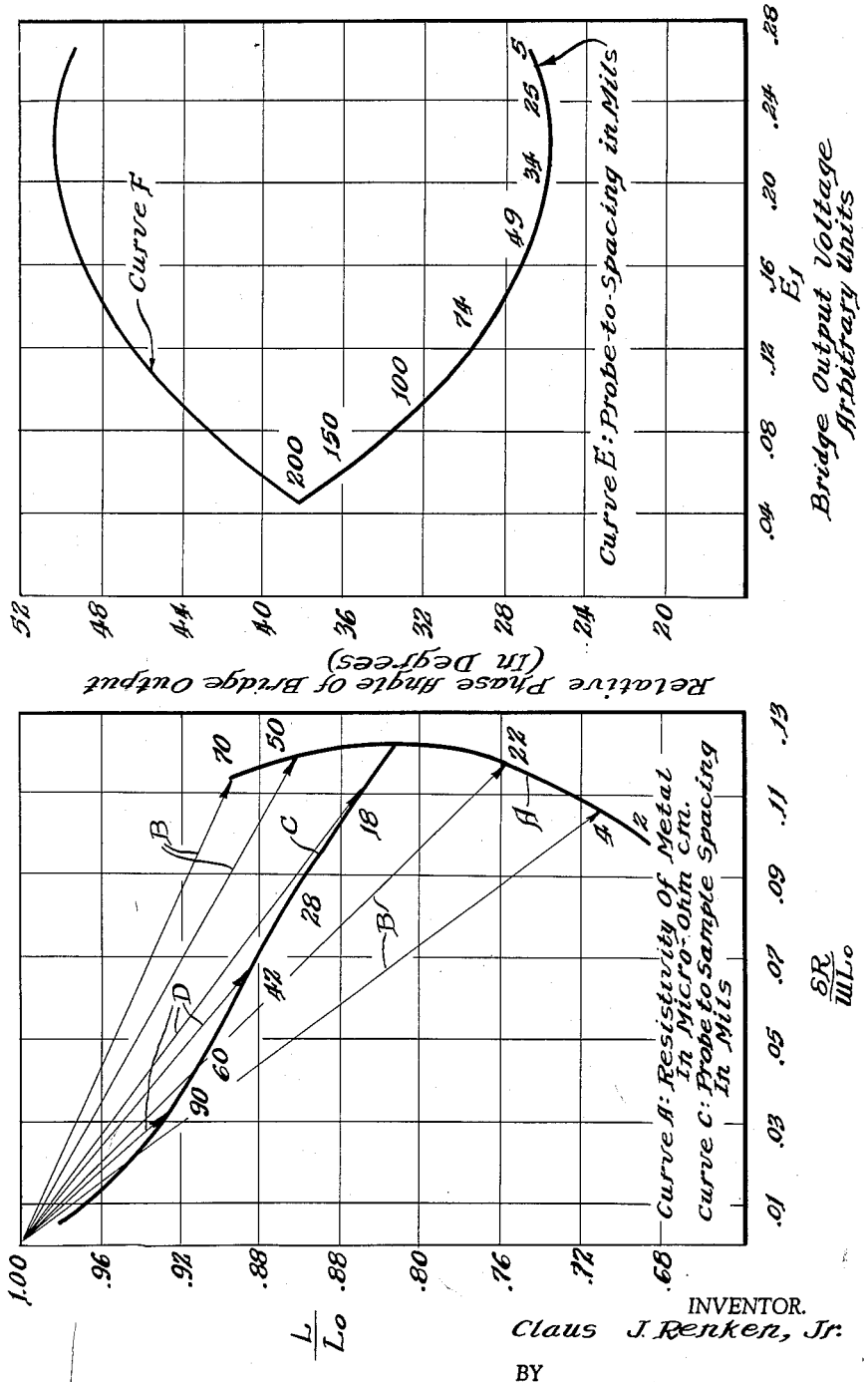
INVENTOR.
Claus J. Renken, Jr.
BY
Attorney May 23, 1961 C. J. RENKEN, JR 2,985,824
NONDESTRUCTIVE EDDY CURRENT TESTING
Filed April 14, 1958 2 Sheets-Sheet 2
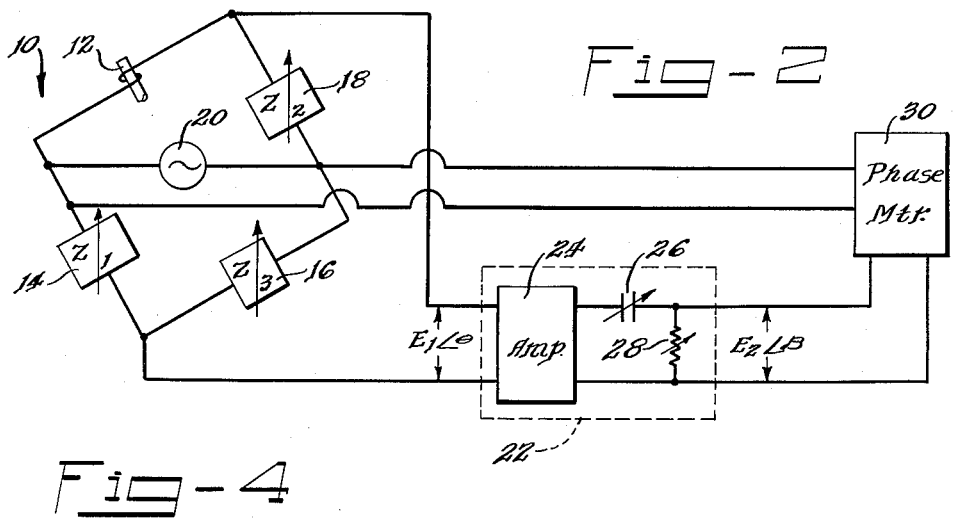
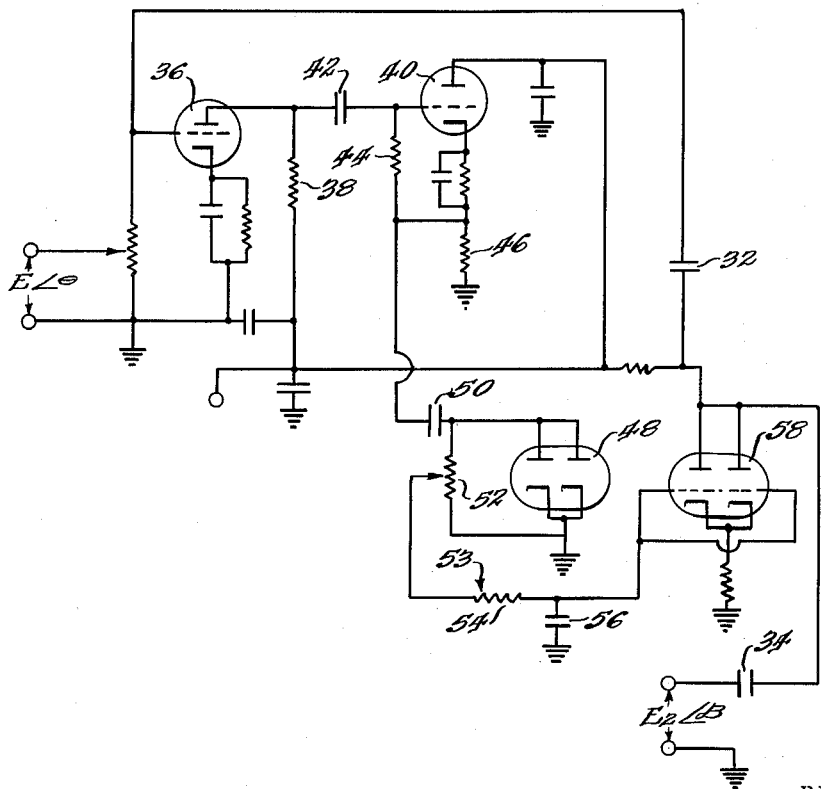
INVENTOR.
Claus J. Renken, Jr.
BY
Roland A. Anderson
Attorney

United States Patent Office 2,985,824
Patented May 23, 1961

2,985,824

NONDESTRUCTIVE EDDY CURRENT TESTING

Claus J. Renken, Jr., Lemont, Ill., assignor to the United States of America as represented by the United States Atomic Energy Commission Filed Apr. 14, 1958, Ser. No. 728,495

10 Claims. (Cl. 324—40)

This invention relates to the testing of metal continuity by means of eddy currents and more particularly the testing by eddy currents wherein the phase angle of the output of the associated equipment is a measure of the metal continuity.

Eddy current testing techniques are well known in the art and provide a nondestructive but efficient means for determining certain characteristics of metallic samples. Generally the technique of eddy current testing involves applying an alternating signal to a test sample and measuring the effects of the counter E.M.F. set up by the eddy currents in the sample on the applied signal. Discontinuities in the metallic samples such as the bond surface between a metal core and its cladding, breaks in the bond between two metals, under surface voids in a metal object, etc., cause changes in the induced eddy currents. The effects of the changes in the eddy currents may be analyzed and interpreted as measurable indices of the discontinuities.

One of the central problems in the nondestructive testing of metals by eddy currents has been the reduction of the effect of varying probe-to-sample spacing on the test results. Changes in probe-to-sample spacing have varying effects on the induced eddy currents, and hence the test results which reduces the sensitivity thereof. It will be noted that in the testing of samples of circular cross section by means of a circular test probe or coil, changes in probe-to-sample spacing may be caused by diameter variations of the sample; while in the test of plane samples such as a plate with a point type probe the variation in probe-to-sample spacing may be caused by irregularities of the surface of the sample or by vibrations of the probe or sample.

By eliminating the effects of probe-to-sample spacing on test results without causing the probe to contact the sample surface, the use of eddy current techniques is greatly enhanced in production quality control. It will be noted that sample surface contact is undesirable because of the wear on the test probe.

It is therefore an object of this invention to provide a method for the nondestruction testing of metallic samples by eddy current techniques wherein the effects of variations in probe to sample spacing have a minimum effect on the test results.

It is also an object of this invention to provide a device for the nondestruction testing of metallic samples by eddy current techniques wherein the effects of variations in probe-to-sample spacing have a minimum effect on the test results.

Other objects and advantages of this invention will become obvious in a further study of this specification in view of the accompanying drawings in which:

Figure 1 is a graph in which curves are drawn showing the effect on test probe impedance of changes in probe-to-sample spacing and sample conductivity;

Figure 2 is a schematic block diagram of a circuit for a device which will accomplish the objects of this invention;

Figure 3 is a graph in which curves are drawn showing the relationship between the voltage amplitude and phase angle of the bridge output with probe-to-sample spacing and also the amplification characteristic of the compensating network in the circuit of Fig. 2; and Figure 4 is a circuit diagram of a specific compensating network for the device of the invention.

The objects and advantages of this invention are best accomplished where changes in the continuity of the metal in the sample are caused to phase modulate and applied alternating electric signals. Since changes in the probe-to-sample spacing causes the applied signal to be amplitude modulated as well as phase modulated, the phase of the signal may be adjusted responsive to the amplitude modulation caused by the probe-to-sample spacing to counteract the phase modulation caused by the probe-to-sample spacing.

It is well known that the impedance of an inductance wound probe may vary when it is brought into proximity with a sample of nonferromagnetic metal. The impedance of the probe will vary as indicated in the typical curve referenced with the letter A of Fig. 1 when the conductivity of the tested sample is varied while maintaining the probe-to-sample spacing constant. In Fig. 1 the ordinant of the graph is the fraction of the free space inductance obtained when the metal is in proximity of the probe and the abscissa is the incremental change in resistance from the free space value divided by a constant, the free space reactance. The incremental inductance and resistance are both divided by the free space inductance in order to normalize the curve for general use. The arrows referenced B in Fig. 1 are phasors and indicate that there is a marked difference in the impedance phase angle for different values of the resistivity of the metal in the sample. Since continuity changes in the metal sample will change the resistivity of the sample at their point of occurrence they may be indicated by relative changes in the phase angle on a properly calibrated phase meter.

The changes in the probe impedance as the probe-to-sample spacing is varied while maintaining the resistivity of the sample metal constant is indicated by the curve referenced C in Fig. 1. The phasors D drawn to curve C indicate that there is also a slight phase shift of the probe impedance as the probe-to-sample spacing is varied. It is to be noted, however, that there is a distinct difference in the amplitude of the phasors for different values of probe-to-sample spacing. The change in amplitude of the phasors may be represented by the amplitude of an alternating current signal voltage and may be used to compensate for the change in phase angle caused by a change in probe-to-sample spacing. Thus the readings of the phase angle can be made independent of the spacing and will be indicative of the resistivity of the metal in the sample.

Measurements of small changes in probe resistance and inductance may be made by means comprising a bridge network 10 having an inductance wound probe 12 forming one leg thereof as shown in the diagram of Fig. 2. Variable impedances 14, 16 and 18 make up the other three legs of the bridge network 10 to form an Owen type bridge circuit. An oscillator 20 is connected across the input of the bridge network 10 and supplies the alternating electric current signal.

The bridge network 10 can be balanced with the probe far away from the sample to be tested because of the relatively small phase angle change for changes in probe-to-sample spacing. When the probe is brought into proximity with the metal sample the impedance of the probe will be altered by the conductivity of the sample and the change in probe-to-sample spacing. The change in the inductance of the probe 12 will disturb the balance of the bridge network 10 and cause a sinusoidal voltage to appear at the bride network output.

The impedance looking into the output of the bridge network 10 can be given by the formula $$Z = \frac{K}{\left(1 - \frac{L}{L_0}\right) + j\frac{\delta R}{WL_0}}$$

assuming that the bridge is balanced with the probe at a substantial distance from the metal sample and then brought close to it. The quantity K is a factor of the Owen type bridge and is nearly constant for small changes in the inductance and resistance of the probe. It will be noted that the real part of the denominator of the expression for Z indicates the ordinant of the graph in Fig. 1 and the imaginary part indicates the abscissa thereof. The phase angle of the denominator quantity is represented by the phasors B and D shown in Fig. 1 and described hereinbefore.

In Fig. 3 curve E is a plot of the phase angle of the bridge output voltage relative to the driving oscillator voltage versus the relative magnitude of the voltage developed across the bridge output terminals. The phase angle shall henceforth be referred to as $\theta$ and the relative magnitude as $E_1$. The curve E represents the changes in the relative phase angle $\theta$ and the bridge output voltage $E_1$ as the probe-to-sample spacing is varied while maintaining the conductivity of the sample constant.

It is to be understood that the probe 12 may be used for testing flat plate type samples as well as cylindrically shaped and other shaped samples. For testing flat plate type samples an inductance wound point type probe is used and is so positioned that the axis of the probe is perpendicular to the surface of the sample. For testing cylindrically shaped objects a point type probe or an inductance wound annular shaped coil may be used. The coil type probe is concentrically positioned around the sample and moved axially thereover. In testing a cylindrically shaped object with the point type probe the probe is moved axially along the cylindrical sample while the sample is rotated.

The sinusoidal voltage at the output of the unbalanced bridge network 10 is applied to the input of a compensating network 22. The compensating network 22 as shown in Fig. 1 comprises an amplifier 24 with a simple phase shift circuit connected across the output thereof. The phase shift network is represented by a variable capacitor 26 series connected with the variable resistance 28 across the output of the amplifier, the output of the compensating circuit being taken across the variable resistance 28. The compensating circuit 22 is so adapted that a phase shift A is added to the relative phase angle $\theta$ of the input voltage $E_1$ in accordance with the amplitude of the input voltage $E_1$. The amplitude of the voltage $E_1$ is used to vary the resistance of the variable resistor 28 and/or the capacitance of the variable capacitor 26 so that the output voltage $E_2$ of the compensating circuit has a corrected relative phase angle $\beta$. The compensating network 22 therefore has an operating characteristic $$K \angle \alpha = \frac{E_2 \angle \beta}{E_1 \angle \theta}$$

Thus $\beta = \alpha + \theta$ and the network operates to minimize the effect of varying probe-to-sample spacing by varying $\alpha$ in such a way with changes in probe-to-sample spacing that the effect is to maintain $\beta$ constant. In other words, the compensating network 22 will function as indicated by the curve F in Fig. 3 which is complementary to curve E and produces a resultant thereof which is a straight line of constant phase angle. A specific embodiment of a compensating circuit which functions in this manner will be hereinafter described.

The output of the compensating circuit 22 is coupled to one of the inputs of the phase measuring instrument 30. The other input is connected across the alternating electric current signal source 20 so that the phase measuring instrument 30 measures the phase shift between the originally applied signal and the output of the compensating circuit 24. The phase meter 30 is properly calibrated so that it will directly read changes in the resistivity of the tested sample.

In Fig. 4 is diagramed a simple phase shift circuit which may be used as the compensating network 22 in the manner described with relation to the curves in Fig. 3. A portion of the voltage $E_1 \angle \theta$ from the output of the compensating network 22 is coupled directly to the output of the compensating network through capacitances 32 and 34. The remainder of the voltage $E_1 \angle \theta$ is applied to the grid of a tube 36 wherein it is amplified and applied across a load resistor 38. The amplified signal is transmitted to the grid of tube 40 through the coupling network comprising the capacitance 42 and resistance 44. The tube 40 is a part of a cathode follower circuit with limited feedback and the output therefrom is taken across the load resistor 46. The signal is then applied to the two anodes of the double diode 48 through the coupling capacitance 50. It will be noted that the cathodes of the double diode 48 are commonly connected to ground so that the tube serves as a single diode. The diode 48 rectifies the converted signal so that only the negative half cycles are applied through the variable rectifier load resistor 52 to the filter network comprising the resistance 54 and the capacitance 56.

The negative D.C. voltage from the filter network 53 is supplied to the grids of a double triode 52. The output of the compensating network is taken across the tube 58 through the coupling capacitance 34.

The double triode 58 acts as a variable resistance in that its plate resistance varies directly with its applied grid voltage. Thus the double triode tube 58 along with capacitance 32 form a phase shift network essentially as shown in the compensating network 22 of Fig. 2 wherein the variable resistor is operable responsive to the amplitude of the voltage $E_1 \angle \theta$ such that the phase angle of the compensating network output voltage $E_2 \angle \beta$ remains constant regardless of variations in probe-to-sample spacing.

There are other schemes which are useful as compensating networks to vary the phase angle in response to the amplitude of the input voltage so that the phase angle of the output of the compensating network remains constant for changes in probe-to-sample spacing. One scheme involves the controlling of the amount of feedback current flowing in an amplifier feedback loop, thus changing the over-all amplification characteristic of the amplifier. Another scheme which can be used involves varying the saturation of a saturable reactor, thus changing its inductance to provide a phase shift which varies with the saturating current.

It is the intent of the applicant not to be bound by the disclosure made hereinbefore but only by the limitations of the appended claims.

What is claimed is:

1. A device for testing metal comprising means for applying an alternating electric signal to said metal, the physical characteristics of said metal causing said signal to be phase modulated, the spacing between said applying means and said metal causing said signal to be phase and amplitude modulated, compensating means for removing the phase modulation caused by the spacing, said compensating means responsive to the amplitude modulation caused by the spacing, and means for measuring the phase modulation of said signal.

2. A device for testing metal continuity comprising a balanced bridge circuit, means for applying an alternating electric signal across said bridge, means for applying a portion of said signal to the metal being tested, said applying means forming one leg of said bridge, said bridge arranged to become unbalanced when said portion of said signal is applied to the metal, the phase angle of the voltage output of said bridge with respect to said alternating electric signal being a measure of the metal continuity, and means associated with the output of said bridge circuit for compensating for any component of said phase angle related to variations in spacing between the metal and said applying means.

3. A device for testing metal continuity comprising a balanced bridge circuit, means for applying an alternating electric signal across the input of said bridge, means for applying a portion of said signal to the metal being tested, said applying means forming one leg of said bridge, said bridge arranged to become unbalanced when said portion of said signal is applied to the metal, the phase angle of the voltage output of said bridge with respect to said alternating electric signal being a measure of the metal continuity, a linear amplifier connected to the output of said bridge, compensating means connected to the output of said amplifier, said compensating means adapted to maintain a constant phased voltage output when said test metal is continuous regardless of variations in the spacing between said tested metal and said applying means, said compensating means operable responsive to the amplitude of the voltage output of said amplifier caused by variations in spacing between the tested metal and said applying means.

4. A device for testing the continuity of metal comprising; a bridge circuit having a variable impedance component in each of three legs, an inductance wound probe forming the fourth leg of said bridge; a signal producing oscillator connected across the input of the bridge circuit; an amplifier connected to the output of said bridge circuit; a compensating network, said compensating network comprising a capacitive element series connected to a variable resistive element across the output of said amplifier, and means responsive to voltage fluctuations in the amplifier output caused by variations in probe-to-metal spacing for varying the resistance of the variable resistance; and a phase meter having one input connected across the variable resistance element and another input connected across said oscillator.

5. The device of claim 4 wherein the variable resistive element comprises a vacuum tube whose plate resistance varies with its input voltage; and the means for varying the resistance of the variable resistive element comprises a vacuum tube amplifier stage coupled to the input of a cathode follower stage whose output is connected to a rectifier and filter network, the output of said rectifier and filter network being coupled to the input of the variable resistive element.

6. The method of testing continuity in a metal article with a probe comprising generating an alternating electric signal, causing the changes in metal continuity in the tested article to phase modulate said signal, the probe-to-article spacing causing said signal to be phase and amplitude modulated, and adjusting the phase of said signal responsive to the amplitude modulation caused by the probe-to-article spacing to counteract the phase modulation caused thereby.

7. The method of testing continuity in a metal article with a probe comprising generating an alternating electric signal, causing the changes in metal continuity in the tested article to phase modulate said signal, the probe-to-article spacing causing said signal to be phase and amplitude modulated, removing a portion of said modulated signal converting said portion to a D.C. voltage the amplitude of which is proportional to the probe-to-article spacing, and using said D.C. voltage to phase modulate said signal to remove the phase modulation component related to said spacing.

8. The method of testing continuity in a metal article comprising applying an alternating electric signal to a balanced bridge network, a test probe forming one part of the bridge network, placing the tested article in the proximity of the probe, changes in the tested article causing said network to become unbalanced and register said signal at a modulated phase, variations in the probe-to-article spacing causing said signal to be phase modulated and amplitude modulated, and applying the signal to a compensating network wherein said amplitude modulation is used to balance out the phase modulation caused by the spacing variations.

9. The method of eliminating the effect of probe-to-article spacing in magnetic testing wherein the article tested is subjected to an alternating electric signal field and the variations in the field due to continuity breaks causes a phase shift in the signal producing the field, comprising removing a voltage component from said signal and using the amplitude of said voltage component to maintain the phase shift constant in the presence of variations in probe-to-article spacing.

10. The method of eliminating the effect of probe-to-article spacing in magnetic testing wherein the article tested is subjected to an alternating electric signal field and the variations in the field due to continuity breaks causes a phase shift in the signal producing the field, comprising maintaining the phase shift of the signal constant in the presence of variations in probe-to-article spacing by removing a voltage component from said signal and using a characteristic thereof which is variable responsive to said spacing.

References Cited in the file of this patent
UNITED STATES PATENTS 2,764,734     Yates _____ Sept. 25, 1956